(12) United States Patent
Yang

(10) Patent No.: US 11,541,806 B2
(45) Date of Patent: Jan. 3, 2023

(54) DYNAMIC OBJECT DETECTION INDICATOR SYSTEM FOR AN AUTOMATED VEHICLE

(71) Applicant: Motional AD LLC, Boston, MA (US)

(72) Inventor: Yifan Yang, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 305 days.

(21) Appl. No.: 16/360,761

(22) Filed: Mar. 21, 2019

(65) Prior Publication Data

US 2020/0298749 A1 Sep. 24, 2020

(51) Int. Cl.
| | |
|---|---|
| *B60Q 1/50* | (2006.01) |
| *G01S 13/72* | (2006.01) |
| *G01S 13/931* | (2020.01) |
| *B60Q 1/46* | (2006.01) |
| *G05D 1/00* | (2006.01) |
| *B60Q 1/00* | (2006.01) |

(52) U.S. Cl.
CPC .............. *B60Q 1/50* (2013.01); *B60Q 1/0011* (2013.01); *B60Q 1/46* (2013.01); *G01S 13/72* (2013.01); *G01S 13/931* (2013.01); *G05D 1/0055* (2013.01); *G01S 2013/9316* (2020.01); *G01S 2013/9323* (2020.01)

(58) Field of Classification Search
CPC .......... B60Q 1/50; B60Q 1/0011; B60Q 1/46; G01S 13/72; G01S 13/931; G01S 2013/9323; G01S 2013/9316; G05D 1/0055
See application file for complete search history.

(56) References Cited

U.S. PATENT DOCUMENTS

| | | | |
|---|---|---|---|
| 8,344,894 B2 * | 1/2013 | Szczerba | G01S 13/867 |
| | | | 340/576 |
| 2017/0369055 A1* | 12/2017 | Saigusa | G08G 1/164 |
| 2019/0018416 A1* | 1/2019 | Gassend | G01S 17/931 |
| 2019/0265703 A1* | 8/2019 | Hicok | G05D 1/0242 |

\* cited by examiner

*Primary Examiner* — Ig T An
(74) *Attorney, Agent, or Firm* — Fish & Richardson P.C.

(57) ABSTRACT

A system includes a tracking system, a controller-circuit, and a device. The tracking system is configured to detect and track an object, and includes one or more of a computer vision system, a radar system, and a LIDAR system. The controller-circuit is disposed in a host vehicle, and is configured to receive detection signals from the tracking system, process the detection signals, determine, whether an object is detected based on the processed detecting signals, and in accordance with a determination that an object is detected, output command signals. The device is adapted to be mounted to the host vehicle, and is configured to receive the command signals and thereby provide a dynamic visual indication adapted to change in accordance with orientation changes between the host vehicle and the object. The dynamic visual indication is viewable from outside of the host vehicle.

20 Claims, 3 Drawing Sheets

DYNAMIC OBJECT DETECTION INDICATOR SYSTEM FOR AN AUTOMATED VEHICLE

TECHNICAL FIELD

The present disclosure relates to automated vehicles, and more particularly, to a dynamic object detection indicator system for an automated vehicle.

SUMMARY

A system according to one non-limiting, exemplary embodiment of the present disclosure includes a tracking system, a controller-circuit, and a device. The tracking system is configured to detect and track an object, and includes one or more of a computer vision system, a radar system, and a LIDAR system. The controller-circuit is disposed in a host vehicle, and is configured to receive detection signals from the tracking system, process the detection signals, determine, whether an object is detected based on the processed detecting signals, and in accordance with a determination that an object is detected, output command signals. The device is adapted to be mounted to the host vehicle, and is configured to receive the command signals and thereby provide a dynamic visual indication adapted to change in accordance with orientation changes between the host vehicle and the object. The dynamic visual indication is viewable from outside of the host vehicle.

A method of operating the system according to another, non-limiting, embodiment, includes the steps of detecting and tracking an object by a tracking system. Once detected, the detection signals are received by a controller-circuit from the tracking system. The controller-circuit then orientates the object with respect to a host vehicle. A command signal based on the changing orientation is sent by the controller-circuit to a detector device that is viewable from the outside of the host vehicle. The detector device generates a dynamic visual indication indicative of the changing orientation.

A non-transient computer readable medium according to another, non-limiting, embodiment of the present disclosure contains program instructions for causing a system to perform a method. The method includes the steps of detecting and tracking an object by a tracking system. Once detected, the detection signals are received by a controller-circuit from the tracking system. The controller-circuit then orientates the object with respect to a host vehicle. A command signal based on the changing orientation is sent by the controller-circuit to a detector device that is viewable from the outside of the host vehicle. The detector device generates a dynamic visual indication indicative of the changing orientation.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
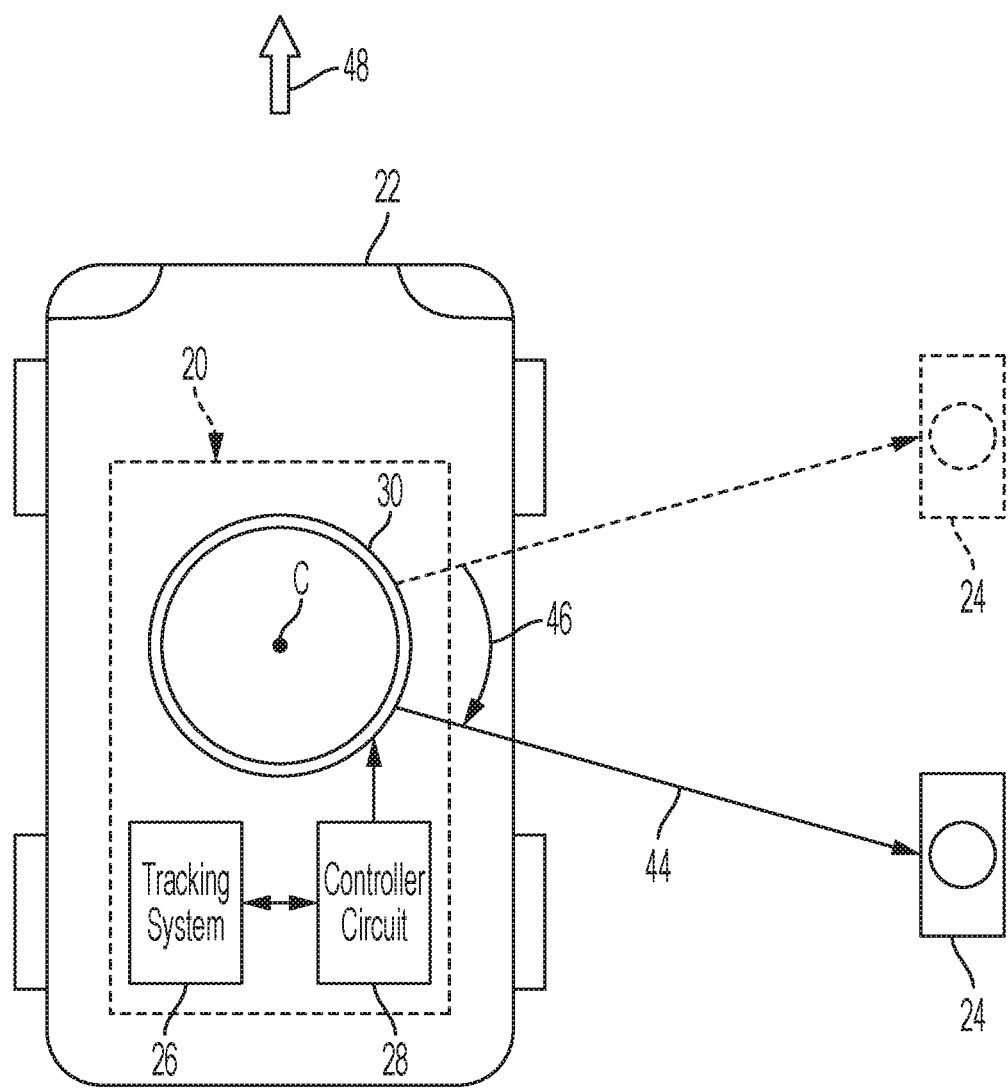
FIG. 1 is a plan view of a host vehicle utilizing a dynamic object detection indicator system as one exemplary embodiment of the present disclosure.

Referring to FIG. 1, a dynamic object detection indicator system 20 is constructed for use on a host vehicle 22. In one example, the host vehicle may be an automated vehicle, or an autonomous vehicle. The indicator system 20 is configured to detect and track an object 24 located externally from the host vehicle 22, and provides a dynamic, visual, indication directed toward the object 24. In one example, the object 24 is a person or pedestrian. Other examples of objects 24 include land-based vehicles, aerial vehicles, geographic features, road signs, and others.

Figure 2:
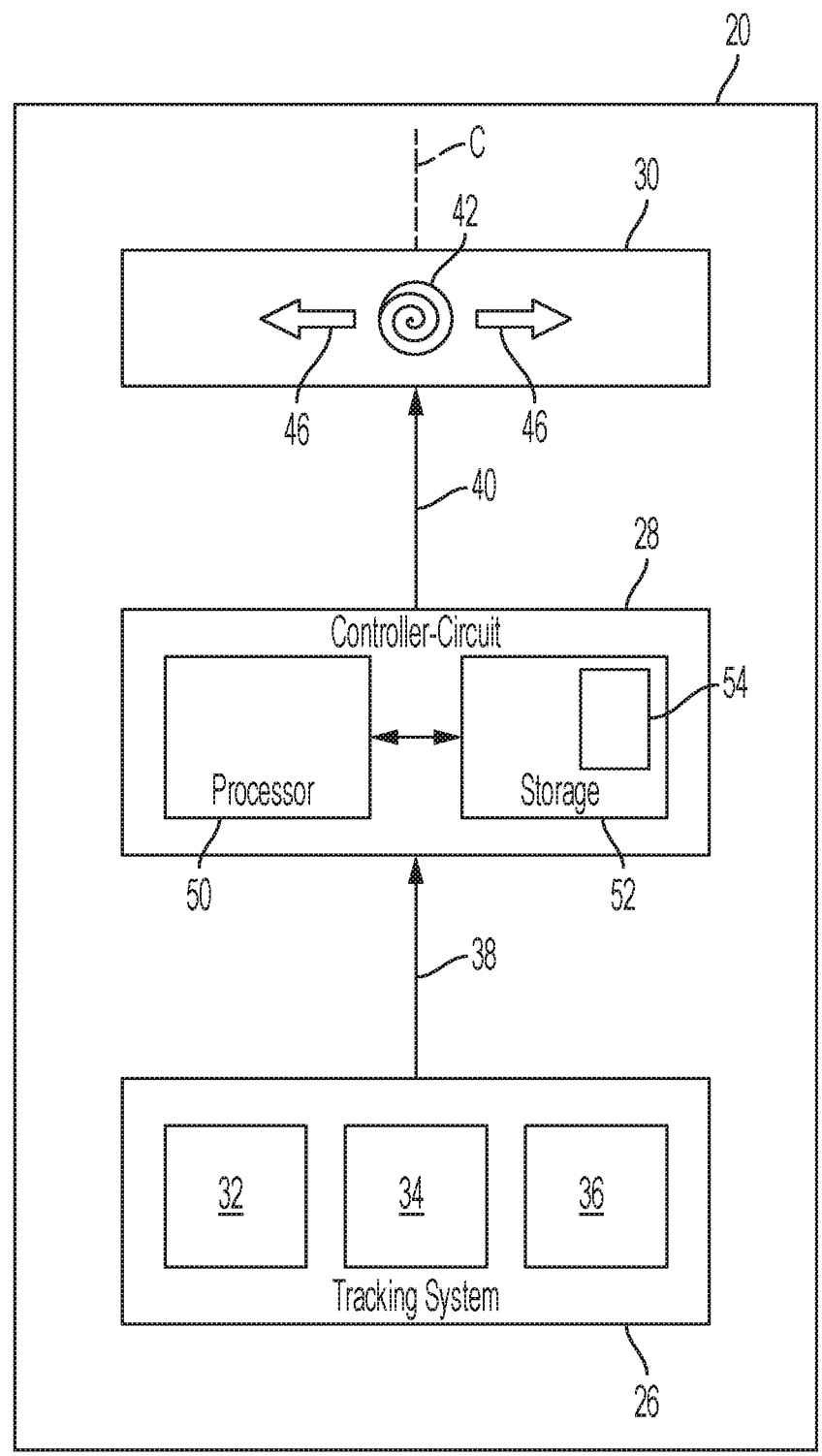
FIG. 2 is a schematic of the dynamic object detection indicator system.

Referring to FIGS. 1 and 2, the indicator system 20 includes a tracking system 26, a controller-circuit 28, and an indicator device 30. The tracking system 26 includes one, or more, of a computer vision system 32, a radar system 34, and a Light Detection and Ranging (LiDAR) system 36 configured to detect and track the object 24 as is known by one skilled in the art. The controller-circuit 28 is configured to receive detection signals (see arrow 38) from the tracking system 26, process the detection signals 38, and based on the detection signals 38, determine if an object is detected. If an object 24 is detected, the controller-circuit 28 transforms the signals 38 into command signals 40 sent to the indicator device 30. Although not illustrated, it is contemplated and understood that the tracking system 26 may further include, or otherwise utilizes, a global positioning system to confirm the geographic location of the host vehicle, and thereby determine a geographic location of the detected object 24.

After initial detection of the object 24, the tracking system 26 continues to detect the object 24, and continues to output detection signals 38. The signals 38 are also indicative of the changing location of the object 24 with respect to the host vehicle 22. In this way, the object 24 is tracked by the indicator system 20. In one embodiment, the controller-circuit 28 may be located in the host vehicle 22. In other embodiments, at least a portion of the controller-circuit 28 may be located remotely from the host vehicle, and is configured to communicate wirelessly with the host vehicle.

The indicator device 30 is configured to receive the command signals 40, and thereby provide a dynamic visual indication 42 (see FIG. 2) that is viewable by the object, or is otherwise directed toward the object, along a direct line-of-sight (see arrow 44 in FIG. 1). The indicator device 30 is carried by, or attached to, the host vehicle 22 at a location that is clearly visible by a person (e.g., pedestrian) located outside of the host vehicle. To maintain the direct line-of-sight 44, the indicator device 30 is adapted to change or maneuver (see arrow 46) the visual indication 42 upon the indicator device 30. This repositioning of the visual indication 42 is facilitated by the tracking capability of the tracking system 26.

As best shown in FIG. 1, and in one scenario example, the host vehicle 22 may initially detect the object 24 along a direct line-of-site 44, represented by dashed lines (i.e., phantom lines). As the host vehicle 22 moves in a forward direction (see arrow 48), the indicator 42 (see FIG. 2), rotates in a clockwise direction 46 to maintain the direct line-of-site 44 with the object 24 that may be stationary (i.e., represented by solid lines to indicate a current or real-time position). In other examples, the host vehicle 22 may be stationary while the object 24 is in motion, or both the host vehicle 22 and the object 24 may be in motion.

It is contemplated and understood that in some examples, the detected object 24 is not be a person, therefore the dynamic visual indication 42 directed toward the object 24 is not directly beneficial to the object itself. However, person(s), external to the host vehicle 22, are still capable of visually seeing that the host vehicle 22 has detected, and is actively tracking, the object 24. This in itself, can be an advantage. For example, the detected object 24 may be something of value and owned by the undetected person. In this scenario, the visual indication 42 provides a degree of comfort, or assurance, to the undetected person that the host vehicle 22 will not drive into, or damage, the detected object 24 because it is being tracked by the host vehicle 22.

In one example, the indicator device 30 is a cylindrical distribution, or array, of lights generally distributed about a substantially vertical centerline C. In this example, the indicator device 30 is mounted to a top of a roof of the host vehicle 22, and the array of lights is a circumferentially continuous row of lights. The lights which are selectively illuminated is the indication 42. As previously described, the indication 42 is adapted to change in orientation to maintain a direct line-of-site 44. In addition, if the indication 42 is a selection of lights and in one example, the illumination intensity of the indication 42 changes as a function of distance between the object 24 and the host vehicle 22. For example, the illumination intensity increases as the distance between the host vehicle 22 and the object 24 decreases. Examples of a light, or light element type, include a light emitting diode (LED), a light guide, and others.

In another example, the dynamic visual indication 42 is, or includes, an illuminated flashing having a frequency that changes as a function of distance between the host vehicle 22 and the object 24. In one embodiment, the frequency increases as the distance between the host vehicle 22 and the object 24 decreases. In another embodiment, both the illumination intensity and the frequency of flashes simultaneously change as a function of distance between the host vehicle 22 and the detected object 24. In yet another example, the color of the dynamic visual indication 42 changes as a function of the direct line-of-site 44 (i.e., orientation or coordinates) between the host vehicle 22 and the object 24.

In one example, the indicator device 30 is constructed such that the direct line-of-site 42 lies in a horizontal plan regardless of the orientation between the host vehicle 22 and the object 24 (i.e., a two-dimensional orientation). In another example, the indicator device 30 is not cylindrical, and instead, is generally hemispherical in shape, capable of dynamic visual indication in a three-dimensional space. In yet another example, if the visual indication 42 is facilitated from an array of lights, the array of lights can be a linear strip of lights, with the lights being viewable from the front and/or back of the host vehicle 22.

In some embodiments, the controller-circuit 28 includes one or more processors 50 (i.e., one illustrated in FIG. 2) and one or more electronic storage mediums 52 (i.e., one illustrated in FIG. 2). In one example, the processor 50 is a microprocessor, or is other control circuitry such as analog and/or digital control circuitry including an application specific integrated circuit (ASIC) for processing data as is known by one with skill in the art. In one example, the storage medium 52 is a non-volatile memory, such as electrically erasable programmable read-only memory (EEPROM) for storing one or more routines, thresholds, and captured data, hereafter referred to as application(s). The applications are executed by one or more of the processors 50 to enable operation, or functioning, of the system 20. Another example of the electronic storage medium 52 is a non-transitory storage medium.

In one embodiment, the dynamic object detection indicator system 20 is configured to recognize the object 24 as, for example, a person. The system 20 is further configured to activate the indicator device 30 only if the object 24 is first recognized as a person. To facilitate this recognition, the system 20 includes a recognition application 54. The recognition application 54 is software-based, stored in the storage medium 52, and is executed by the processor 50 once the object 24 is detected by the tracking system 26. The application 54 is thus configured to apply the signals 38 received from the tracking system 26, and transform the signals into a confirmation that the detected object is, or is not, a person.

Figure 3:
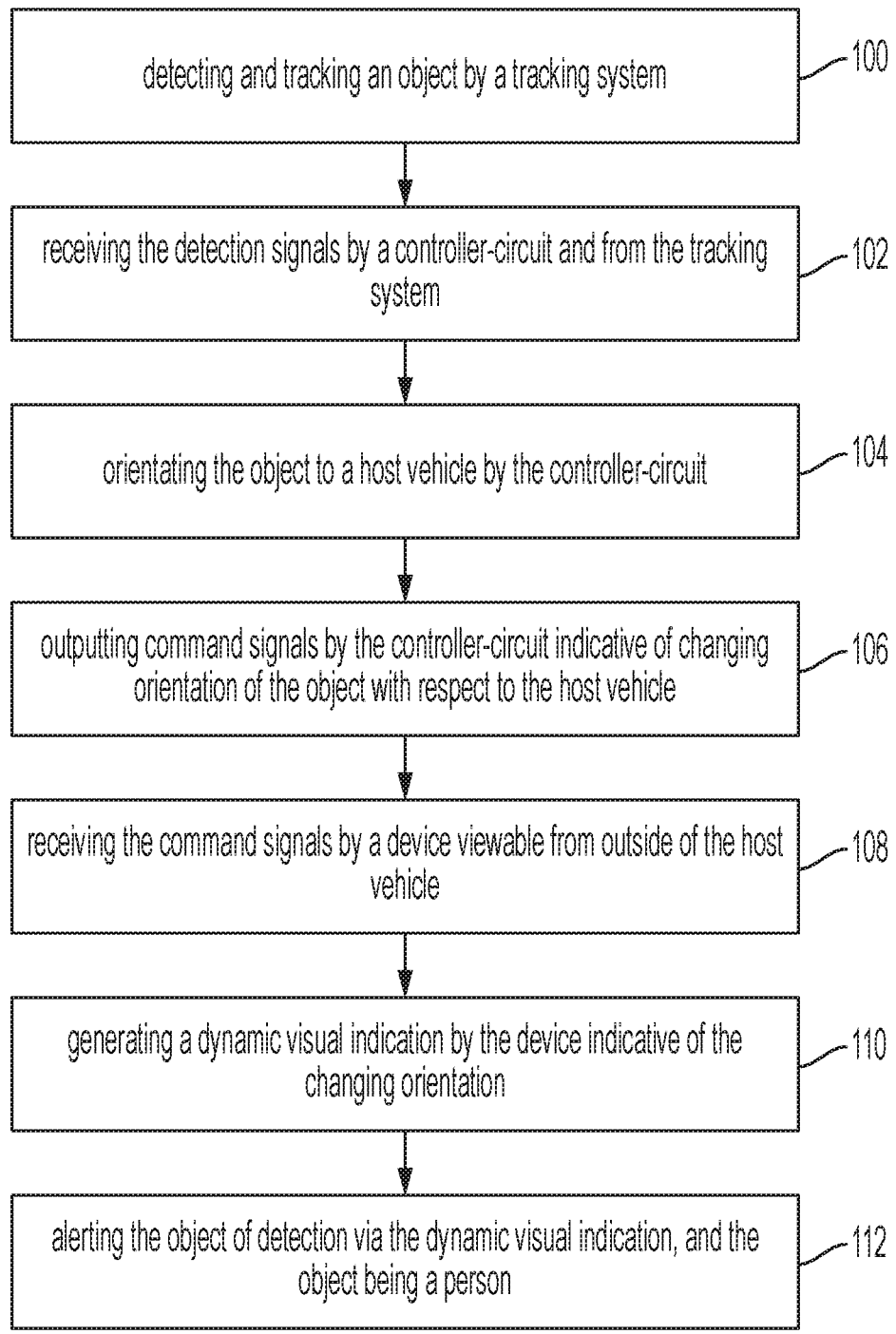
FIG. 3 is a flow chart of a method of operating the dynamic object detection indicator system.

Referring to FIG. 3, a method of operating the dynamic object detection indicator system 20 is illustrated. At block 100, the tracking system 26 detects and tracks the object 24. At block 102, the controller-circuit 28 receives detection signals from the tracking system 26. At block 104, the detection signals 38 are processed and transformed by the controller-circuit 28 to orientate the object 24 to the host vehicle 22. At block 106, the detection signals 38 are transformed to an output command signal 40 by the controller-circuit 28. At block 108, the command signal 40 is received by the indicator device 30. At block 110, the indictor device 30, via the command signal 40, generates a dynamic visual indication 42 that is indicative of the changing orientation between the host vehicle 22 and the detected object 24. At block 112, the object 24 is alerted of the detection via the dynamic visual indication 42 is the object is recognized as a person by the recognition application 54.

Benefits and advantages of the present disclosure include the ability of a host vehicle to visually communicate with an object or person (e.g., pedestrian) that the pedestrian is detected and is being tracked. Other advantages include the reduction of concern, or anxiety, by pedestrians of whether a nearby automated vehicle is aware of their presence.

The various functions described above may be implemented or supported by a computer program that is formed from computer readable program codes, and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other non-transitory forms.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms used herein such as component, application, module, system, and the like are intended to refer to a computer-related entity, either hardware, a combination of hardware and software, or software execution. By way of example, an application may be, but is not limited to, a process running on a processor, a processor, an object, an executable, a thread of execution, a program, and/or a computer. An application running on a server and the server, may be a component. One or more applications may reside within a process and/or thread of execution and an application may be localized on one computer and/or distributed between two or more computers.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system comprising:
   a tracking system configured to detect and track an object, the tracking system including one or more of a computer vision system, a radar system, and a LIDAR system;
   a controller-circuit disposed in a host vehicle and configured to:
     receive detection signals from the tracking system,
     process the detection signals,
     determine, based on the processed detecting signals, whether an object is detected, and
     in accordance with a determination that an object is detected, output command signals;
   an indicator device adapted to be mounted to the host vehicle and to provide a dynamic visual indication that is viewable from outside of the host-vehicle, the indicator device configured to:
     receive the command signals;
     responsive to the command signals, change its physical orientation relative to the host vehicle to track the object so as to maintain a direct line-of-sight with the object; and
     provide the dynamic visual indication.

2. The system set forth in claim 1, wherein the dynamic visual indication is an illumination that changes in intensity as a distance between the host vehicle and the object changes.

3. The system set forth in claim 1, wherein the dynamic visual indication is an illuminated flashing with changing frequency based on a changing distance of the object from the host vehicle.

4. The system set forth in claim 1, wherein the dynamic visual indication is an illuminated flashing with changing frequency based on a changing distance of the object from the host vehicle.

5. The system set forth in claim 1, wherein the dynamic visual indication is an illumination that changes in intensity as a distance between the host vehicle and the object changes.

6. The system set forth in claim 5, wherein the illumination increases in intensity as the object approaches the vehicle.

7. The system set forth in claim 1, wherein the dynamic visual indication is a change in color relative to the line-of-sight.

8. The system set forth in claim 1, wherein the indicator device includes an array of lights configured to provide the dynamic visual indication that illuminates toward the object when detected.

9. The system set forth in claim 8, wherein the array of lights illuminate with greater intensity toward the object.

10. The system set forth in claim 8, wherein the array of lights is a circumferentially continuous row of lights.

11. The system set forth in claim 8, wherein the array of lights is a linear strip of lights.

12. The system set forth in claim 8, wherein each light of the array of lights include at least one of an LED and a light guide.

13. The system set forth in claim 1, wherein the indicator device includes an array of lights, and each light is selectively activated based on range and direction of the object when detected.

14. The system set forth in claim 1, wherein the controller-circuit is configured to execute a recognition application that facilitates recognition of the object and the indicator device provides the dynamic visual indication accordingly.

15. A method comprising:
   receiving, with at least one controller-circuit, detection signals from a tracking system;
   determining, with the at least one controller-circuit and based on the detection signals, that an object is detected;
   responsive to determining that an object is detected, generating, with the at least one controller-circuit, output command signals;
   responsive to the output command signals, changing, with the at least one controller-circuit, a physical orientation of an indicator device relative to the host vehicle to track the object so as to maintain a direct line-of-sight with the object, where the indicator device is adapted to be mounted to the host vehicle; and
   providing, by the indicator device, a dynamic visual indication that is viewable from outside of the host vehicle.

16. A non-transient computer readable medium storing instructions, that when executed by at least one processor, cause the at least one processor to perform operations comprising:
    receiving detection signals from a tracking system;
    determining, based on the detection signals, that an object is detected;
    responsive to determining that an object is detected, generating output command signals;
    responsive to the output command signals, changing a physical orientation of an indicator device relative to the host vehicle to track the object so as to maintain a direct line-of-sight with the object, where the indicator device is adapted to be mounted to the host vehicle and to provide a dynamic visual indication that is viewable from outside of the host vehicle; and
    providing the dynamic visual indication to the indicator device.

17. The method of claim 15, wherein the dynamic visual indication includes an illumination that changes in intensity or frequency.

18. The method of claim 15, wherein the dynamic visual indication includes at least one light that changes in color.

19. The method of claim 15, wherein the indicator device includes a plurality of lights.

20. The method of claim 19, wherein the plurality of lights includes at least one of a circumferentially continuous row of lights or a linear strip of lights.

* * * * *